(12) United States Patent
Fuke et al.

(10) Patent No.: US 12,325,122 B2
(45) Date of Patent: Jun. 10, 2025

(54) CONTROL DEVICE, INSPECTION SYSTEM, CONTROL METHOD, AND NON-TRANSITORY COMPUTER-READABLE MEDIUM

(71) Applicants: MITSUBISHI HEAVY INDUSTRIES, LTD., Tokyo (JP); TOKYO INSTITUTE OF TECHNOLOGY, Tokyo (JP)

(72) Inventors: Yasutaka Fuke, Tokyo (JP); Hirone Komatsu, Tokyo (JP); Takashi Matsuzawa, Tokyo (JP); Shin Asano, Tokyo (JP); Kotaro Tadano, Tokyo (JP); Koshiro Irie, Tokyo (JP); Chanvicharo Ly, Tokyo (JP)

(73) Assignees: MITSUBISHI HEAVY INDUSTRIES, LTD., Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 83 days.

(21) Appl. No.: 18/103,104

(22) Filed: Jan. 30, 2023

(65) Prior Publication Data
US 2023/0241786 A1 Aug. 3, 2023

(30) Foreign Application Priority Data
Feb. 2, 2022 (JP) .................................. 2022-014816

(51) Int. Cl.
*B25J 18/06* (2006.01)
*B25J 9/16* (2006.01)
(Continued)

(52) U.S. Cl.
CPC ............. *B25J 18/06* (2013.01); *B25J 9/1607* (2013.01); *B25J 13/089* (2013.01);
(Continued)

(58) Field of Classification Search
CPC ........ B25J 9/1607; B25J 13/089; B25J 18/06; F16L 2101/30; G05B 19/4155; G05B 2219/40269
See application file for complete search history.

(56) References Cited

U.S. PATENT DOCUMENTS

2010/0234988 A1 9/2010 Buckingham et al.
2011/0319714 A1* 12/2011 Roelle .................. A61B 1/0051
600/118

(Continued)

FOREIGN PATENT DOCUMENTS

EP           3 848 698 A1    7/2021
JP           2017-138584 A   8/2017
(Continued)

*Primary Examiner* — Dale Moyer
(74) *Attorney, Agent, or Firm* — Birch, Stewart, Kolasch & Birch, LLP

(57) ABSTRACT

A control device for an inspection device including a long flexible robot that is formed by connecting a plurality of units and bendable at each unit with a desired curvature, and a posture actuator that adjusts a posture of the unit includes a target posture specifying unit that specifies a target posture including positions of representative points of the respective units traveling along a predetermined route, and an operation amount determination unit that determines an operation amount for bringing the unit to the target posture using a learning model with the target posture of the unit as an input and an operation amount of the posture actuator as an output.

5 Claims, 17 Drawing Sheets

(51) Int. Cl.
  *B25J 13/08* (2006.01)
  *G05B 19/4155* (2006.01)
  *F16L 101/30* (2006.01)

(52) U.S. Cl.
  CPC ...... *G05B 19/4155* (2013.01); *F16L 2101/30* (2013.01); *G05B 2219/40269* (2013.01)

(56)  References Cited

U.S. PATENT DOCUMENTS

| | | | |
|---|---|---|---|
| 2015/0100065 A1* | 4/2015 | Zinn | A61B 34/30 |
| | | | 606/130 |
| 2017/0176737 A1 | 6/2017 | Haffner et al. | |
| 2019/0145905 A1* | 5/2019 | Sibbach | H04N 7/183 |
| | | | 348/82 |
| 2020/0188042 A1 | 6/2020 | Dong et al. | |
| 2021/0213612 A1 | 7/2021 | Onodera et al. | |
| 2021/0402592 A1* | 12/2021 | Takagi | B25J 9/104 |
| 2022/0142712 A1* | 5/2022 | Toporek | G06N 3/082 |
| 2023/0311303 A1* | 10/2023 | Graham | B25J 9/1689 |
| | | | 700/259 |

FOREIGN PATENT DOCUMENTS

| | | |
|---|---|---|
| JP | 6850937 B2 | 3/2021 |
| JP | 2021-109280 A | 8/2021 |
| WO | WO 2020/090959 A1 | 5/2020 |
| WO | WO 2020/173814 A1 | 9/2020 |

* cited by examiner

CONTROL DEVICE, INSPECTION SYSTEM, CONTROL METHOD, AND NON-TRANSITORY COMPUTER-READABLE MEDIUM

BACKGROUND OF THE INVENTION

Field of the Invention

The present disclosure relates to, for example, a control device, an inspection system, a control method, and a non-transitory computer-readable medium in the field of inspection of industrial plants.

Priority is claimed on Japanese Patent Application No. 2022-014816, filed Feb. 2, 2022, the content of which is incorporated herein by reference.

Description of Related Art

A robot that is used for inspection of confined spaces is known. Such a robot has, for example, a multi-joint structure and is configured to be long and flexibly bendable so that the robot can reach a final destination through a confined space. Hereinafter, a robot having such a configuration is also referred to as a "long flexible robot".

Patent Document 1 discloses a drive control device that moves a robot along a predetermined route inside an inspection target object. This robot has a configuration in which a plurality of tubes are connected together. The drive control device operates wires fixed to each tube with a posture actuator to adjust the posture of the tube along a route so that the posture changes from time to time.

PATENT DOCUMENTS

[Patent Document 1] International Publication No. 2020/090959

SUMMARY OF THE INVENTION

However, in the related art, a target posture of a tube set to be along a route by a drive control device and an actual posture of the tube are likely to become misaligned from each other due to various factors such as elongation due to tension of a wire, attenuation of the tension due to friction between the wire and a wire insertion hole provided in each tube, non-linearity of a wire load and the elongation, and variation in characteristics of the wire.

The present disclosure has been made in view of such problems, and provides a control device, an inspection system, a control method, and a non-transitory computer-readable medium capable of more accurately adjusting the posture of a long flexible robot.

According to an aspect of the present disclosure, a control device for an inspection device including a long flexible robot that is formed by connecting a plurality of units and bendable at each unit with a desired curvature, and a posture actuator configured to be able to adjust a posture of the units includes: a target posture specifying unit configured to specify a target posture including positions of representative points of the respective units traveling along a predetermined route; and an operation amount determination unit configured to determine an operation amount for bringing the units to the target posture using a learning model with the target posture of the units as an input and an operation amount of the posture actuator as an output.

According to an aspect of the present disclosure, an inspection system includes the control device according to the aspect described above and an inspection device.

According to an aspect of the present disclosure, a control method for an inspection device including a long flexible robot that is formed by connecting a plurality of units and bendable at each unit with a desired curvature, and a posture actuator configured to be able to adjust a posture of the units includes: specifying a target posture including positions of representative points of the respective units traveling along a predetermined route; and determining an operation amount for bringing the unit to the target posture using a learning model with the target posture of the unit as an input and an operation amount of the posture actuator as an output.

According to an aspect of the present disclosure, a non-transitory computer-readable medium having a program recorded thereon, the program causing an inspection device including a long flexible robot that is formed by connecting a plurality of units and bendable at each unit with a desired curvature, and a posture actuator configured to be able to adjust a posture of the unit, to execute: specifying a target posture including positions of representative points of the respective units traveling along a predetermined route; and determining an operation amount for bringing the unit to the target posture using a learning model with the target posture of the unit as an input and an operation amount of the posture actuator as an output.

With the control device, the inspection system, the control method, and the non-transitory computer-readable medium according to the present disclosure, it is possible to adjust the posture of a long flexible robot more accurately.

BRIEF DESCRIPTION OF THE DRAWINGS

FIG. 11 is a diagram illustrating a processing flow in a learning mode of the CPU according to the second embodiment.

DETAILED DESCRIPTION OF THE INVENTION

First Embodiment

Hereinafter, a control device and an inspection system including the same according to the first embodiment will be described with reference to FIGS. 1 to 13.

(Overview of Overall Configuration of Inspection System)

Figure 1:
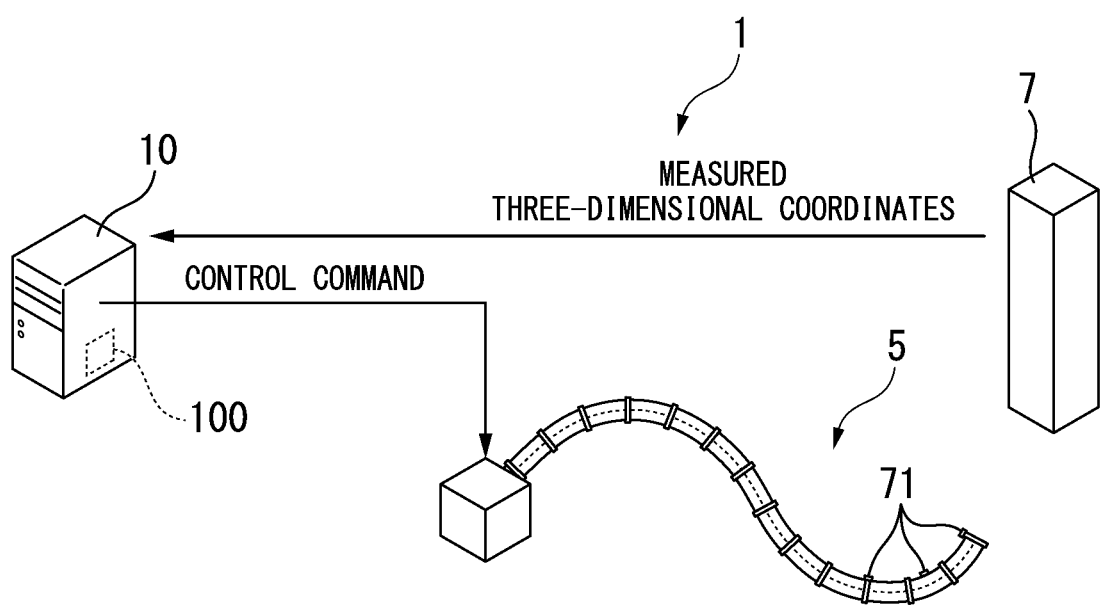
FIG. 1 is a diagram illustrating the overall configuration of an inspection system according to a first embodiment.

FIG. 1 is a diagram illustrating an overall configuration of the inspection system according to the first embodiment.

The inspection system 1 illustrated in FIG. 1 is used for inspection of confined spaces (for example, the inside of a gas turbine, steam turbines, or the like).

As illustrated in FIG. 1, the inspection system 1 includes a control device 10 and an inspection device 5. The inspection system 1 operates in either of two modes including a learning mode in which a model used for control of the inspection device 5 is learned, and a control mode in which the inspection device 5 is controlled using the learned model. The inspection system 1 further includes a position measurement sensor 7 only in the learning mode.

(Configuration of Inspection Device)

First, the inspection device 5 will be described in detail with reference to FIGS. 2 to 7.

The inspection device 5 is a device that can be inserted into the inside of an inspection target (a gas turbine or the like) and check the inside of the inspection target. The inspection device 5 of the present embodiment includes an inspection cable 61 (FIG. 3) and a long flexible robot 6.

First, an overall configuration of the long flexible robot 6 will be described with reference to FIG. 2.

The long flexible robot 6 includes a tube 62 in which a plurality of units U are connected in series. The unit U has a multi-joint structure that can be bent at a plurality of points, and has a structure that can be bent in a desired direction within a predetermined range (for example, a range up to 90°). However, one unit U can be bent only at one curvature on the basis of a structure to be described below, and a deformation into a shape with two curvatures (for example, an S shape) cannot be made with only one unit.

Figure 2:
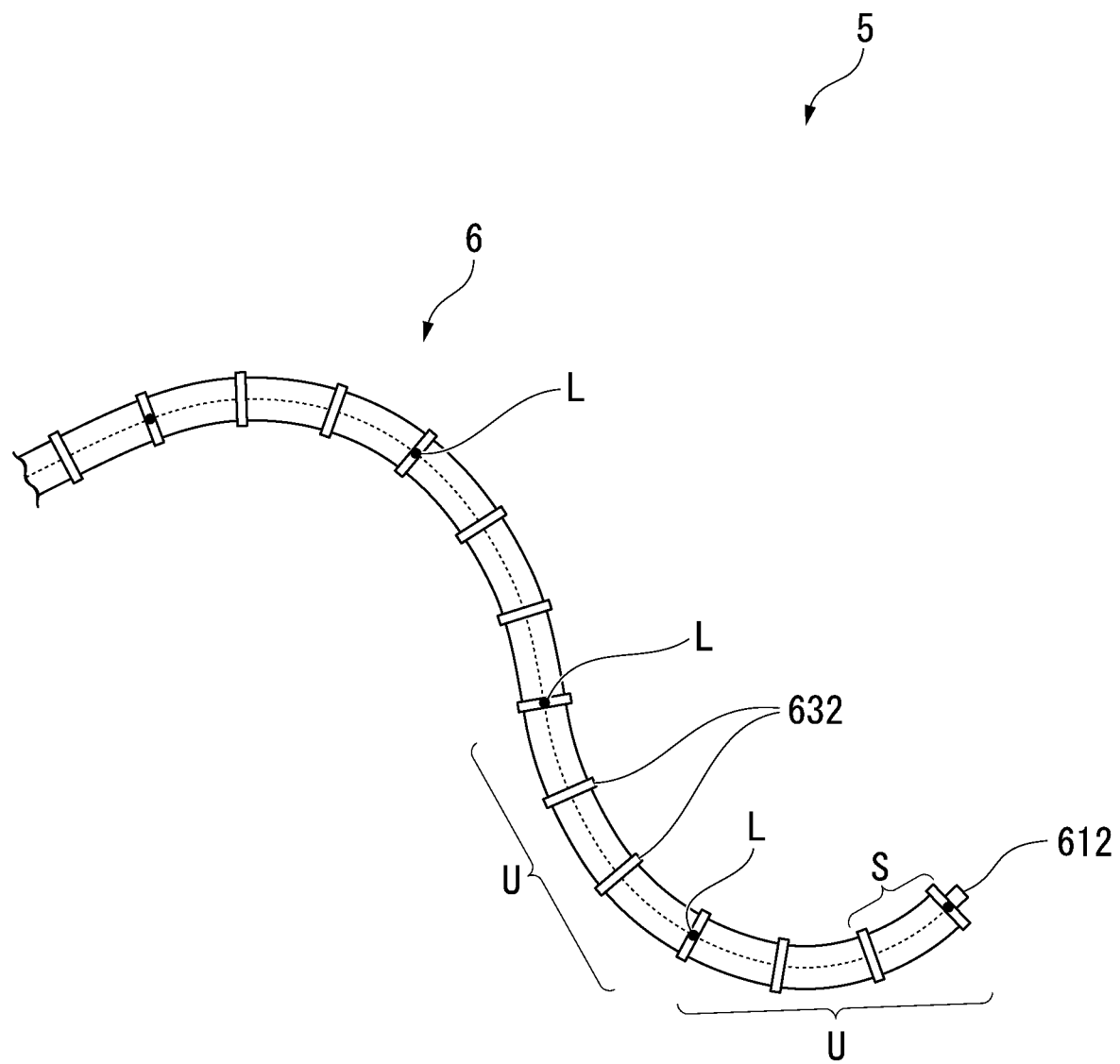
FIG. 2 is a first diagram illustrating a configuration of the inspection device according to the first embodiment.

The respective units U are connected in series at connection portions L (portions indicated by black dots in FIG. 2). Further, in the present embodiment, one unit U includes three sections S, for example. A boundary (connection portion L) of each unit U and a boundary of each section S are separated by a flange 632.

A sensor 612 provided at a tip of the inspection cable 61 (FIG. 3) is inserted out from a tip of the long flexible robot 6.

Next, configurations of the inspection cable 61 and the long flexible robot 6 will be described in detail with reference to FIGS. 3 to 7.

The inspection cable 61 includes a highly flexible cable body 611 and the sensor 612. The cable body 611 can be bent in any direction intersecting a cable extension direction, which is a direction in which the cable body 611 extends, by an operator operating an operation unit (not illustrated). The cable body 611 is a member separate from the tube 62 and is detachably fixed to the tube 62. The cable body 611 is provided with an actuator (not illustrated) for cable movement so that the cable body 611 can be driven independently of the long flexible robot 6.

The sensor 612 is fixed to a tip of the cable body 611. The sensor 612 and the cable body 611 are built into the tube 62 (which will be described below). The sensor 612 of the present embodiment is a camera capable of imaging the inside of the inspection target. Captured data such as a video or an image captured by the sensor 612 is sent to a camera image monitor or the like via a cable extending from an end portion (rear end) of the cable body 611 at which the sensor 612 is not provided. As the inspection cable 61 of the present embodiment, for example, a borescope (an industrial endoscope) for observation or inspection of a deep part that cannot be directly visually observed is used.

The long flexible robot 6 (the tube 62) may have a bendable structure, and may be, for example, a snake-like robot having a multi joint structure in which a plurality of highly flexible members are connected.

Further, the sensor 612 is not limited to being a camera as in the present embodiment. For example, the sensor 612 of the present embodiment may be a sensor 612 having a dimension measurement function (for example, three-dimensional phase measurement) or a sensor 612 capable of measuring temperature or presence and absence of scratches.

The long flexible robot 6 includes the tube 62, a posture actuator 65, and an advance and retreat actuator 67.

Figure 3:
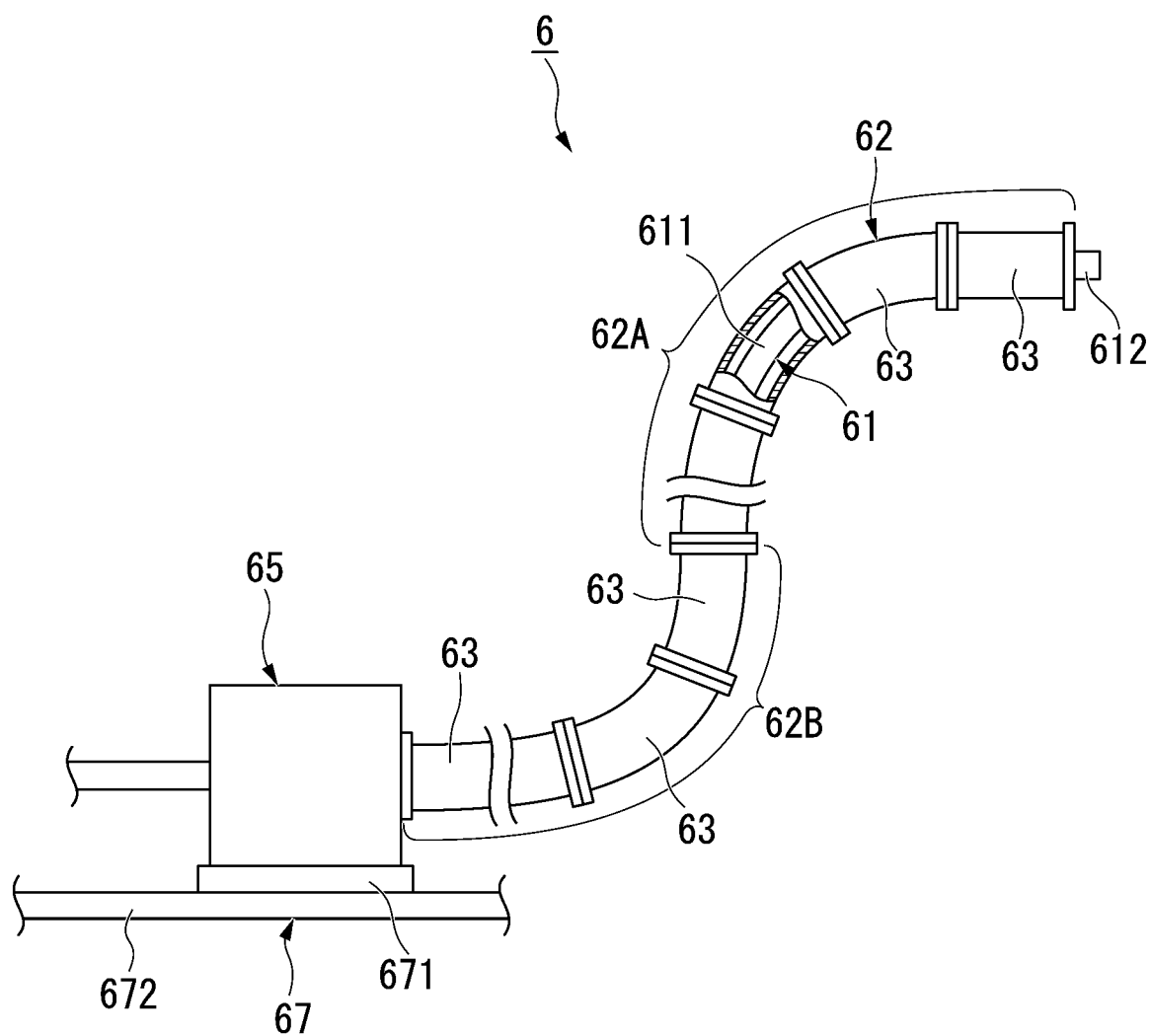
FIG. 3 is a second diagram illustrating the configuration of the inspection device according to the first embodiment.

A hollow portion through which the inspection cable 61 can be inserted is formed inside the tube 62, as illustrated in FIG. 3. The tube 62 has flexibility. The tube 62 has a multi-joint structure that can be bent at a plurality of points. Therefore, the tube 62 can be bent in any direction intersecting with a tube extension direction, which is a direction in which the tube 62 extends. It is preferable for each joint portion of the tube 62 to have a structure that is easy to bend, but difficult to twist and compress. An outer diameter of the tube 62 is set to a size (for example, 10 mmφ) that can be inserted into a confined space that is the inspection target. The cable body 611 is detachable from the tube 62. The tube 62 of the present embodiment is configured by connecting a plurality of tube bodies 63. One tube body 63 corresponds to one section S illustrated in FIG. 2.

Figure 4:
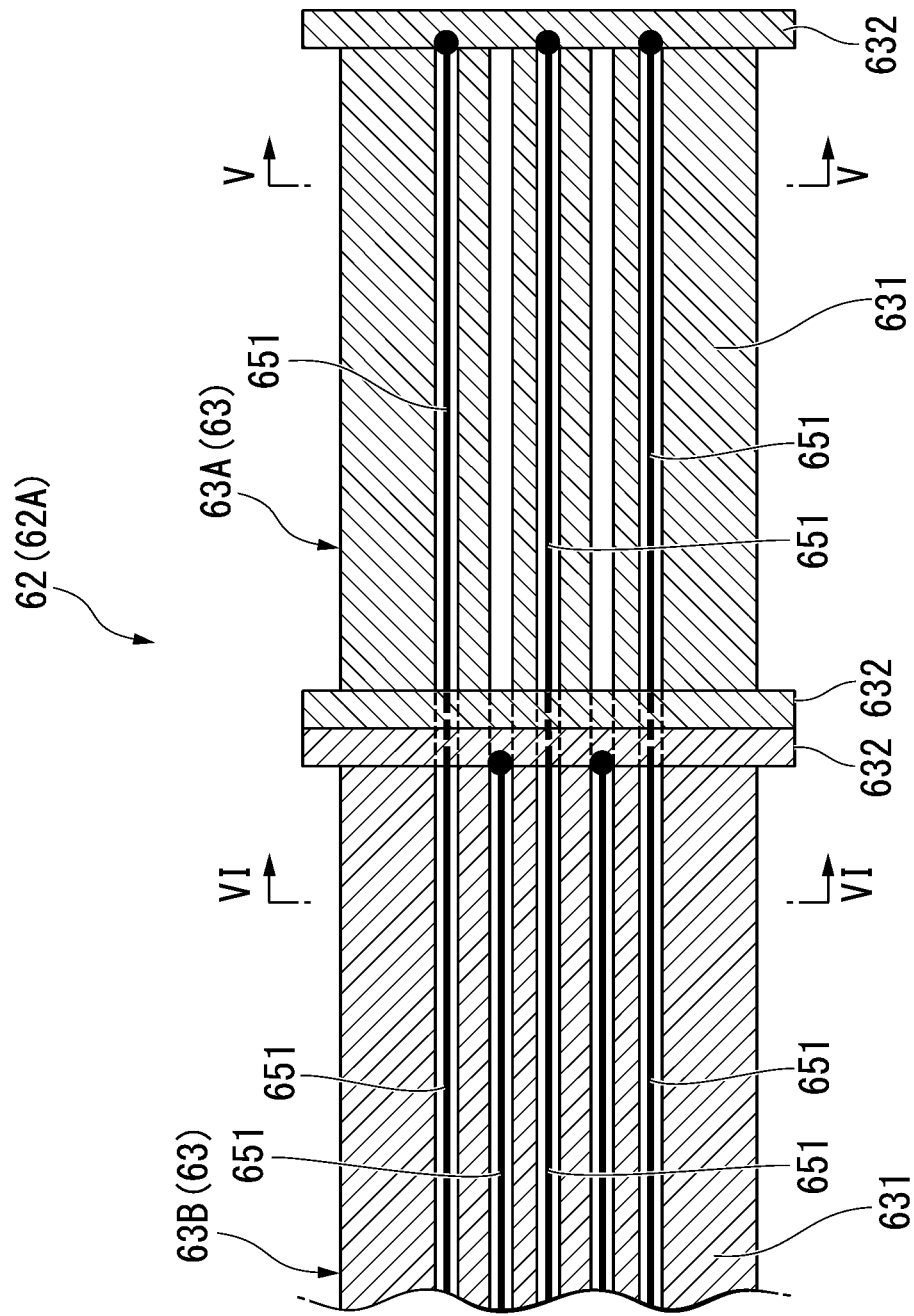
FIG. 4 is a third diagram illustrating the configuration of the inspection device according to the first embodiment.

The plurality of tube bodies 63 are disposed side by side in a direction in which the tube bodies 63 extend, and are connected to each other. As illustrated in FIG. 4, the tube body 63 includes a cylindrical portion 631 with both open ends, and the flange 632 projecting outwards in a radial direction from outer peripheral surfaces of both the ends of the cylindrical portion 631. The cylindrical portion 631 has a cylindrical shape through which the inspection cable 61 can be inserted. The cylindrical portion 631 includes, for example, a plurality of slits (not illustrated) formed therein, and can be bent in any direction. The flange 632 has an annular shape and is integrally formed with the cylindrical portion 631.

As illustrated in FIG. 3, the posture actuator 65 can adjust a posture of the tube 62. Here, the posture of the tube 62 is a position and direction of a tip of the tube 62 on a virtual plane intersecting with the tube extension direction. The posture actuator 65 of the present embodiment is fixed to a base end (a rear end) of the tube 62. The posture actuator 65 includes a plurality of wires 651, a housing portion 652, a pulley 653, a wire drive unit 654, and a wire load detection unit 655, as illustrated in FIG. 7.

Figure 5:
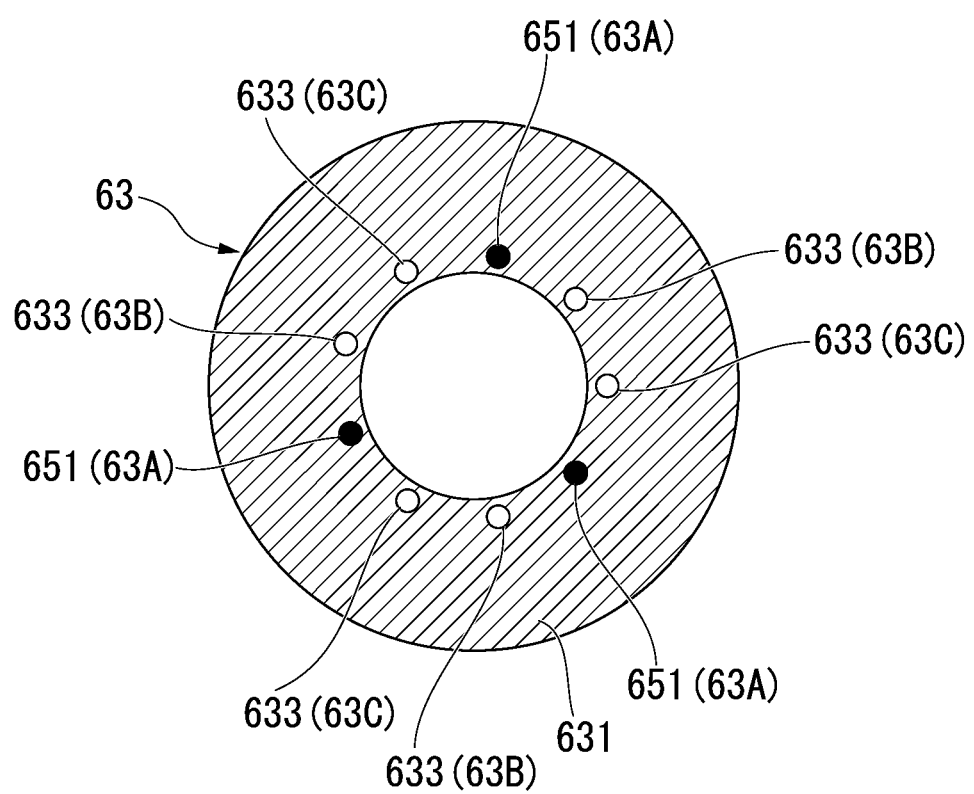
FIG. 5 is a fourth diagram illustrating the configuration of the inspection device according to the first embodiment.
Figure 6:
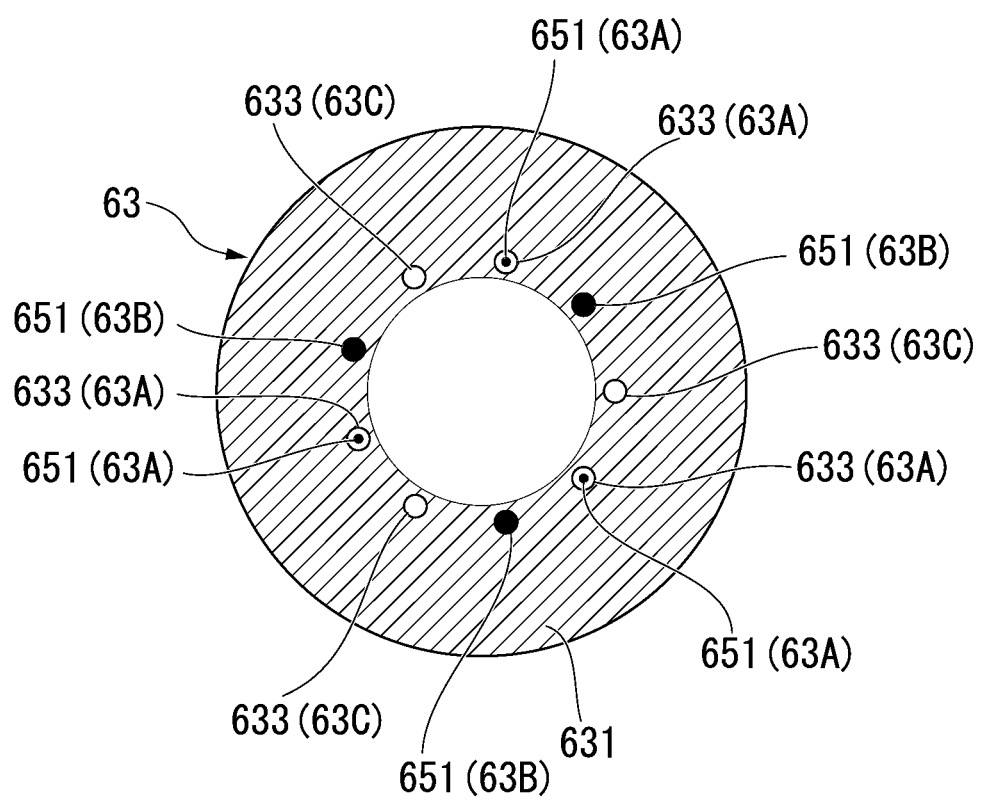
FIG. 6 is a fifth diagram illustrating the configuration of the inspection device according to the first embodiment.

As illustrated in FIG. 4, the plurality of wires 651 (for example, three wires in the present embodiment) are provided for one tube body 63. A tip of the wire 651 is fixed to a tip surface of the tube body 63. The wires 651 are fixed apart from each other with a phase shift (for example, 120 degrees) with respect to the tip surface of one tube body 63, as illustrated in FIG. 5. Further, the wire 651 is disposed with a phase shift with respect to each adjacent tube body 63. Therefore, as illustrated in FIG. 6, in another tube body 63 (tube body 63B) adjacent on the base end side, the fixing position of the wire 651 is shifted by a predetermined angle (for example, 40 degrees) with respect to one tube body 63 (tube body 63A) disposed on the tip side. A wire insertion hole 633 for insertion of the wire 651 is formed in each tube body 63. A spherical portion having a larger diameter than the wire insertion hole 633 is provided at the tip of the wire 651, and the wire 651 is prevented from coining off from the wire insertion hole 633 by this spherical portion (is fixed to the end face of the tube body 63).

Figure 7:
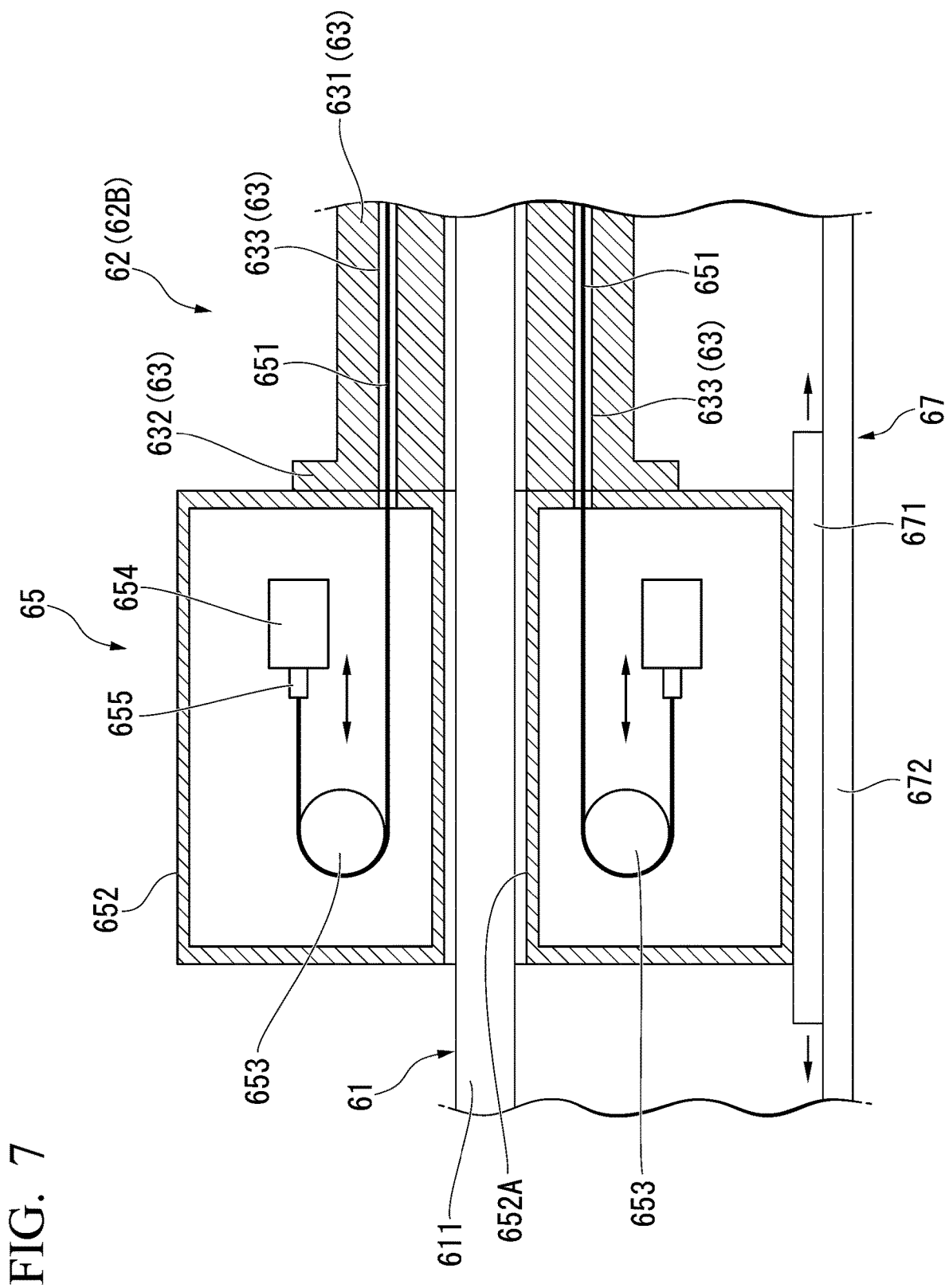
FIG. 7 is a sixth diagram illustrating the configuration of the inspection device according to the first embodiment.

As illustrated in FIG. 7, the housing portion 652 is fixed to the base end of the tube 62. One end of the wire 651 is housed inside the housing portion 652. In the housing portion 652, a housing through hole 652A through which the cable body 611 protruding from the base end of the tube 62 can be inserted is formed. The housing through hole 652A is formed to penetrate the housing portion 652.

The pulley 653 is rotatably mounted inside the housing portion 652. The pulley 653 reverses a direction in which the wire 651 extends inside the housing portion 652. The pulley 653 is provided for each wire 651. That is, one pulley 653 is provided for one wire 651. A plurality of pulleys 653 are provided apart from each other to surround the housing through hole 652A.

The wire drive unit 654 is fixed inside the housing portion 652. The wire drive unit 654 is provided for each wire 651. That is, one wire drive unit 654 is provided for one wire 651. The wire drive unit 654 is connected to the base end of the wire 651, which is an end portion of the wire 651 that is not fixed to the tube body 63, via the wire load detection unit 655. The wire drive unit 654 can cause the wire 651 to advance or retreat with respect to the pulley 653. An electric slider, an electric cylinder, or a ball screw, for example, is used as the wire drive unit 654.

The wire load detection unit 655 is disposed between the base end of the wire 651 and the wire drive unit 654. The wire load detection unit 655 measures a load (wire tensile force) generated in the wire 651 and sends a measurement result to the wire drive unit 654. When the sent measurement result is equal to or greater than a value determined to be too large (for example, a value at which the wire 651 is damaged), the wire drive unit 654 is driven to loosen the wire 651. Further, when the sent measurement result is equal to or smaller than a value determined to be too small (for example, a value at which the wire 651 can be regarded as being bent), the wire drive unit 654 is driven to stretch the wire 651 to the extent that the wire 651 is not loosened. The wire load detection unit 655 may be, for example, a load cell capable of directly measuring the load. Alternatively, the load may be measured indirectly on the basis of a motor current value in the wire drive unit 654.

Further, the posture actuator 65 drives some of the tube bodies 63 disposed at positions close to the tip among the plurality of tube bodies 63. The number of tube bodies 63 driven by the posture actuator 65 may be one or plural. The tube 62 of the present embodiment is divided into an active portion 62A driven by the posture actuator 65 and a driven portion 62B not driven by the posture actuator 65, as illustrated in FIG. 3.

In the active portion 62A, the wire 651 is fixed to the flange 632 of each tube body 63. The active portion 62A is a region of the tube 62 having a predetermined length from the tip. Here, the predetermined length is a length for arrival at a desired inspection range.

The driven portion 62B moves to track a movement of the active portion 62A. In the driven portion 62B, the wire 651 is not fixed to the flange 632 of each tube body 63. The driven portion 62B is a region of the tube 62 from the base end to the active portion 62A. The driven portion 62B of the present embodiment is a region sandwiched between the housing portion 652 and the active portion 62A.

The advance and retreat actuator 67 can cause the tube 62 to advance and retreat. Here, the advance and retreat of the tube 62 means moving the tube 62 in the tube extension direction. The advance and retreat actuator 67 of the present embodiment can move the housing portion 652 to which the tube 62 is fixed. The advance and retreat actuator 67 has a guide rail 672 and an advance and retreat drive unit 671.

The advance and retreat drive unit 671 moves on the guide rail 672. The housing portion 652 is fixed to the advance and retreat drive unit 671. The advance and retreat drive unit 671 is, for example, an electric slider. When the advance and retreat drive unit 671 moves on the guide rail 672 to approach the inspection target, the tube 62 is deeply inserted into the inside of the inspection target. Conversely, when the advance and retreat drive unit 671 moves on the guide rail 672 to be away from the inspection target, the tube 62 is moved from the inside of the inspection target to the vicinity of an entrance.

(Configuration of Position Measurement Sensor)

The position measurement sensor 7 (FIG. 1) measures a position of a representative point of each unit U of the long flexible robot 6 at the time of learning. The representative point is set, for example, at a tip and a center position of each unit U that becomes the active portion 62A. Further, as illustrated in FIG. 1, a marker 71 for position measurement is attached to each representative point.

The position measurement sensor 7 according to the present embodiment is a camera. The camera that is the position measurement sensor 7 measures three-dimensional coordinates indicating a position at which the marker 71 is attached, that is, the position of the representative point of each unit U, from the captured image. The measured three-dimensional coordinates are output to the control device 10. The position measurement sensor 7 may be any sensor as long as the sensor can measure the position of the representative point. For example, in other embodiments, the position measurement sensor 7 is a laser scanner, a LiDAR, or the like. Further, when the representative point of each unit can be identified from a feature such as shape or color, the marker 71 may be omitted.

(Hardware Configuration of Control Device)

Figure 8:
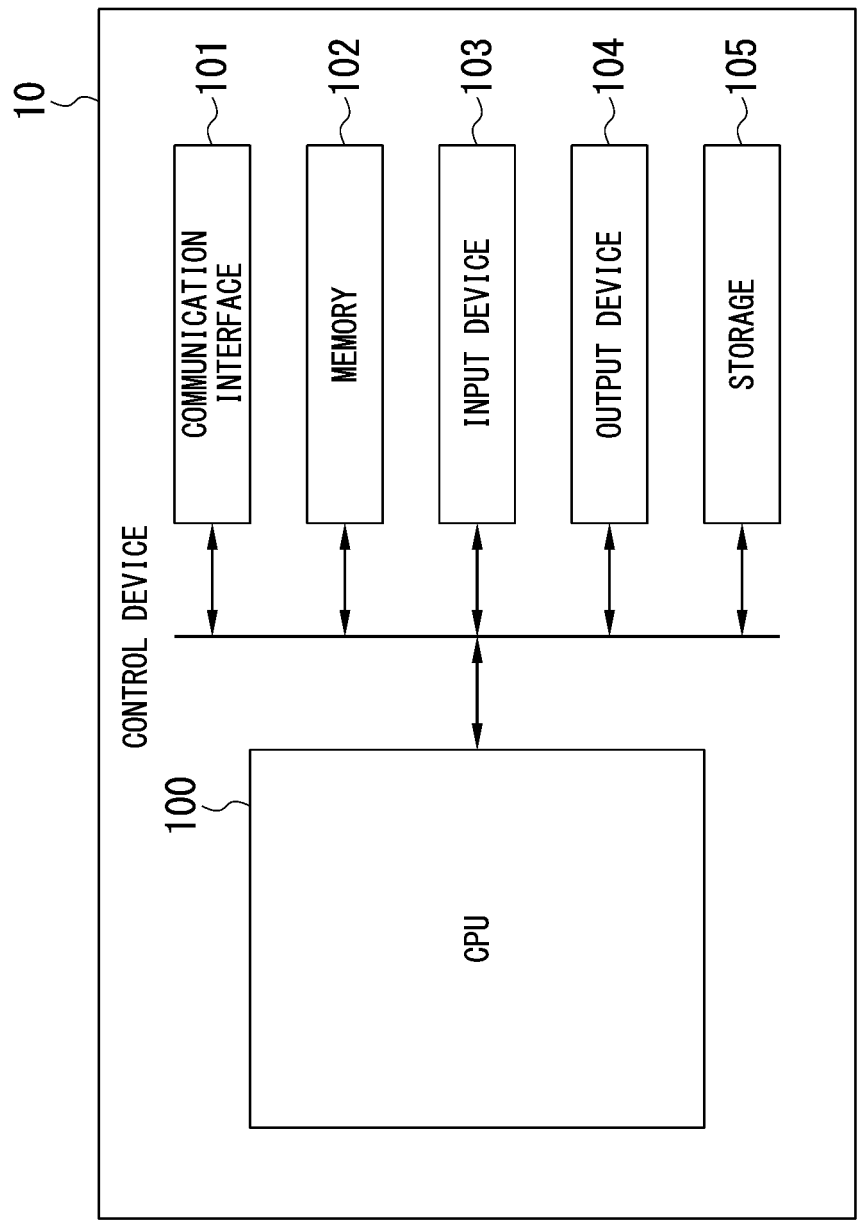
FIG. 8 is a diagram illustrating a hardware configuration of a control device according to the first embodiment.

FIG. 8 is a diagram illustrating a hardware configuration of the control device according to the first embodiment.

As illustrated in FIG. 8, the control device 10 includes a CPU 100, a communication interface 101, a memory 102, an input device 103, an output device 104, and a storage 105.

The CPU 100 exhibits various functions by operating according to a program prepared in advance. Details of the functions of the CPU 100 will be described below.

The communication interface 101 is, for example, an interface for connection with the long flexible robot 6 and other terminal devices.

The memory 102 is a so-called main storage device, and provides a storage area necessary for processing of the CPU 100.

The input device 103 is a device that receives an operation from the operator, and is, for example, a mouse, a keyboard, or a touch sensor.

The output device 104 is a device for outputting various types of information to the operator, such as a display or a speaker.

The storage 105 is a so-called auxiliary storage device, such as a hard disk drive (HDD) or a solid state drive (SSD).

(Functional Configuration of Control Device)

Figure 9:
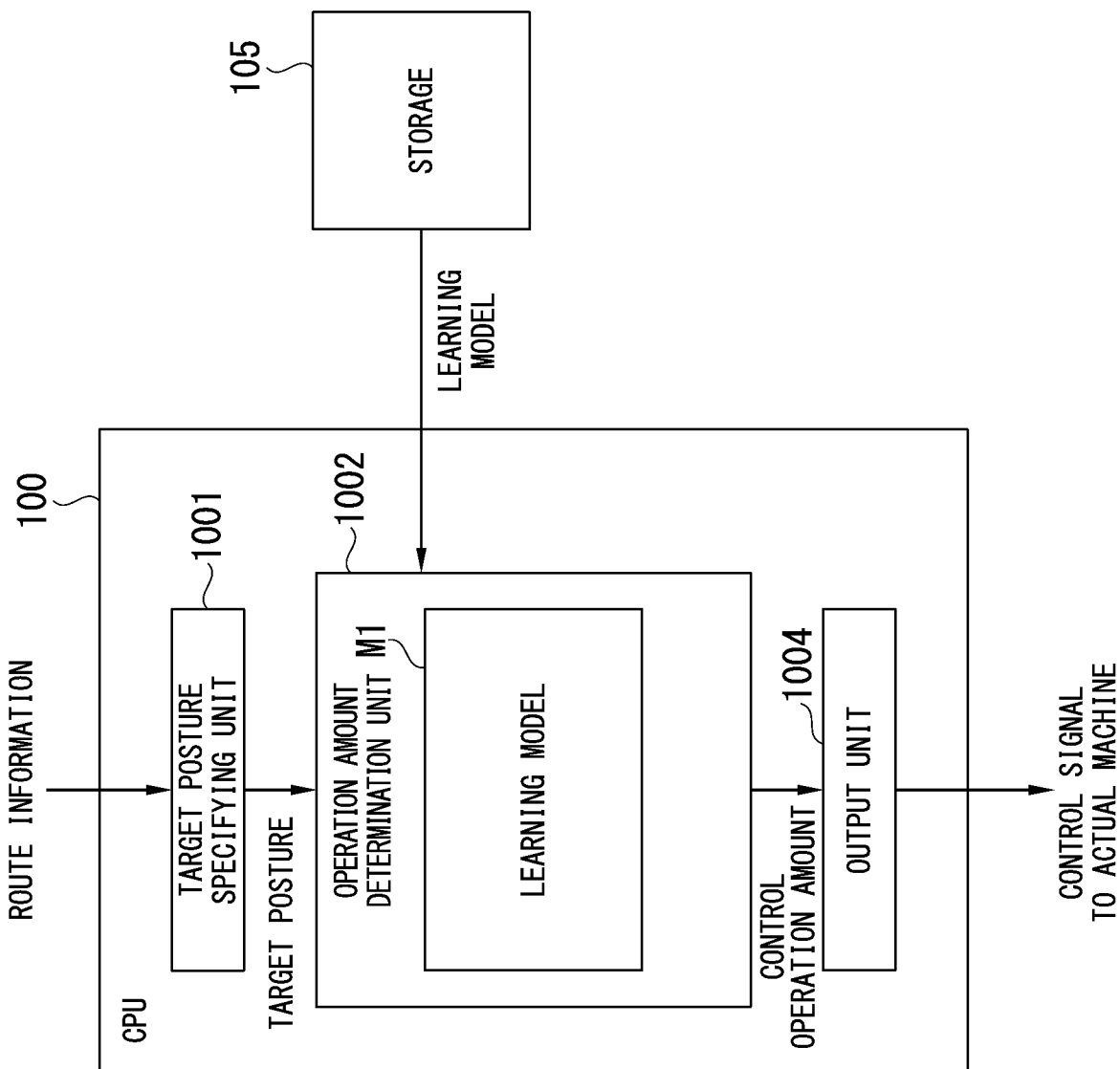
FIG. 9 is a first diagram illustrating a functional configuration of a CPU according to the first embodiment.

FIG. 9 is a first diagram illustrating a functional configuration of the CPU according to the first embodiment.

Figure 10:
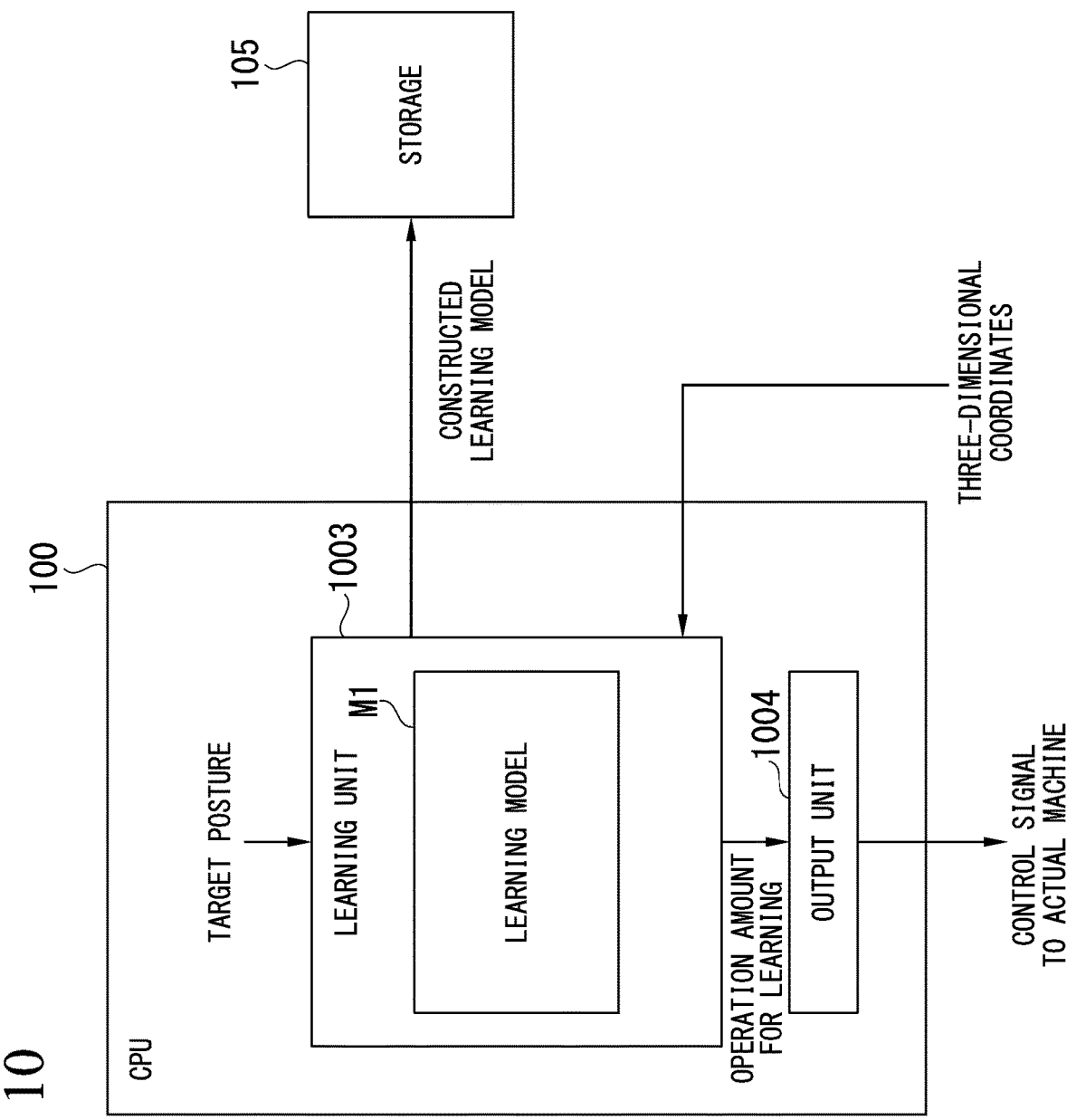
FIG. 10 is a second diagram illustrating the functional configuration of the CPU according to the first embodiment.

FIG. 10 is a second diagram illustrating the functional configuration of the CPU according to the first embodiment.

Next, functions of the CPU 100 will be described with reference to FIGS. 9 to 10.

The CPU 100 according to the present embodiment has a learning mode in which a model (a learning model M1 to be described below) used for control of the long flexible robot 6 is learned, and a control mode in which control of the long flexible robot 6 is performed using the learned model.

First, a functional configuration of the CPU 100 in the control mode will be described with reference to FIG. 9. The CPU 100 in the control mode has functions of a target posture specifying unit 1001, an operation amount determination unit 1002, and an output unit 1004, as illustrated in FIG. 9.

The target posture specifying unit 1001 specifies a target posture of each unit U of the long flexible robot 6 traveling along a predetermined route in the control mode. The route is determined, for example, by a known route generation device (not illustrated) according to an internal structure of the inspection target. The target posture is represented by three-dimensional coordinates of a representative point of each unit U, for example. The target posture specifying unit 1001 specifies the target posture of each unit U so that the position of the representative point of each unit U coincides on the route each time the long flexible robot 6 travels on the route. Here, the target posture specifying unit 1001 outputs the target posture of each unit U in each step in which the long flexible robot 6 travels from an entrance position of the route to a target position in time history.

In the control mode, the operation amount determination unit 1002 uses the learning model M1 with the target posture of each unit U as an input and the operation amount of the posture actuator 65 as an output to determine an operation amount for bringing each unit U to the target posture (hereinafter also referred to as a "control operation amount"). The learning model M1 is a model that has learned a relationship between the operation amount of the posture actuator and a joint posture of the long flexible robot 6, and a model learned by a learning unit 1003, which will be described below, is used. The operation amount is specifically a pulling amount of each wire 651 by the posture actuator 65 (the wire drive unit 654). Here, the operation amount determination unit 1002 outputs the operation amount of each step in which the long flexible robot 6 travels from the entrance position of the route to the target position in time history. The joint posture of the long flexible robot 6 is represented by positions of the representative points of each unit U.

The output unit 1004 outputs the time history of the control operation amount determined by the operation amount determination unit 1002 as a control signal to an actual machine of the long flexible robot 6 in the control mode.

Next, a functional configuration of the CPU 100 in the learning mode will be described with reference to FIG. 10. The CPU 100 in the learning mode functions as the learning unit 1003 and the output unit 1004, as illustrated in FIG. 10.

The learning unit 1003 constructs a learning model M1 on the basis of the operation amount of the posture actuator 65 of the long flexible robot 6 and the position (the three-dimensional coordinates) of the representative point of each unit U measured by the position measurement sensor 7. The learning model M1 is a neural network with the posture of the long flexible robot 6 (the position of the representative point of each unit U) as an input and the operation amount of the wire 651 as an output. Further, in the learning mode, the learning unit 1003 determines an operation amount of the posture actuator 65 (hereinafter also referred to as an "operation amount for learning"), instead of the operation amount determination unit 1002.

In the learning mode, the output unit 1004 outputs the operation amount for learning determined by the learning unit 1003 as a control signal to the actual machine of the long flexible robot 6.

(Processing Flow of Learning Mode)

Figure 11:
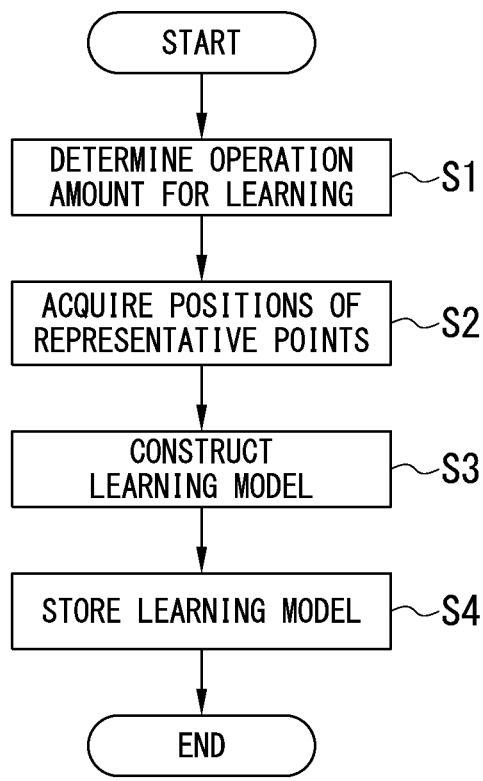
FIG. 11 is a diagram illustrating a processing flow in a learning mode of the CPU according to the first embodiment.

FIG. 11 is a diagram illustrating a processing flow of the learning mode of the CPU according to the first embodiment.

Hereinafter, a flow of processing in the learning mode of the CPU 100 will be described in detail with reference to FIG. 11.

First, the learning unit 1003 determines an operation amount for learning of the posture actuator 65 (step S1). In this case, the learning unit 1003 randomly determines, for example, a value of the operation amount for learning. Further, the operation amount for learning determined by the learning unit 1003 is output from the output unit 1004 as a control signal to the actual machine of the long flexible robot 6. Thus, the long flexible robot 6 changes the posture of each unit U according to the control signal.

Next, the learning unit 1003 acquires a set $\{x_j, y_j, z_j\}$ (j=1 to M, M=the number of representative points) of positions of representative points of each unit U of the long flexible robot 6 with respect to a set Wi (i=1 to N; N: the number of wires) of operation amounts for learning from the position measurement sensor 7 (step S2).

The learning unit 1003 acquires a plurality of pieces of learning data consisting of the set Wi of operation amounts for learning and the set $\{x_j, y_j, z_j\}$ of positions of representative points of each unit U with respect to the set Wi of operation amounts for learning. The learning unit 1003 constructs the learning model M1 on the basis of the acquired learning data (step S3). The learning unit 1003 constructs the learning model M1 using, for example, a deep neural network (DNN).

Further, the learning unit 1003 stores the constructed learning model M1 in the storage 105 (step S4).

(Processing Flow in Control Mode)

Figure 12:
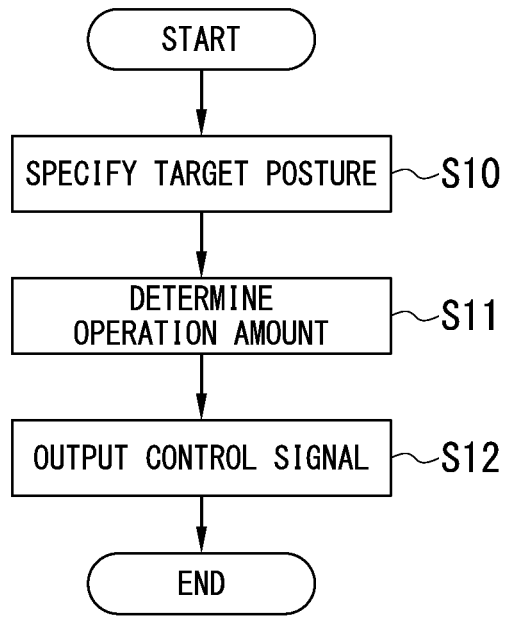
FIG. 12 is a diagram illustrating a processing flow in a control mode of the CPU according to the first embodiment.

FIG. 12 is a diagram illustrating a processing flow in the control mode of the CPU according to the first embodiment.

Hereinafter, a flow of processing in the control mode of the CPU 100 will be described in detail with reference to FIG. 12.

First, the target posture specifying unit 1001 specifies the time history of the target posture of each unit U in each step in which the long flexible robot 6 travels from the entrance position on the predetermined route to the target position (step S10).

Next, the operation amount determination unit 1002 inputs the target posture specified by the target posture specifying unit 1001 to the learning model M1 constructed by the learning unit 1003, which is stored in the storage 105. Thus, the operation amount of the posture actuator 65 with respect to the target posture is output from the learning model M1. The operation amount determination unit 1002 determines the time history of the control operation amount corresponding to the time history of the target posture on the basis of the operation amount output from the learning model M1 (step S11).

Next, the output unit 1004 outputs the time history of the control operation amount determined by the operation amount determination unit 1002 as a control signal to the actual machine of the long flexible robot 6 (step S12). Thus, the posture actuator 65 operates each wire 651 according to the time history of the control operation amount in each step. This makes it possible for the long flexible robot 6 to change the posture so that the long flexible robot 6 travels along the route as the long flexible robot 6 travels along the route.

(Effects)

Figure 13:
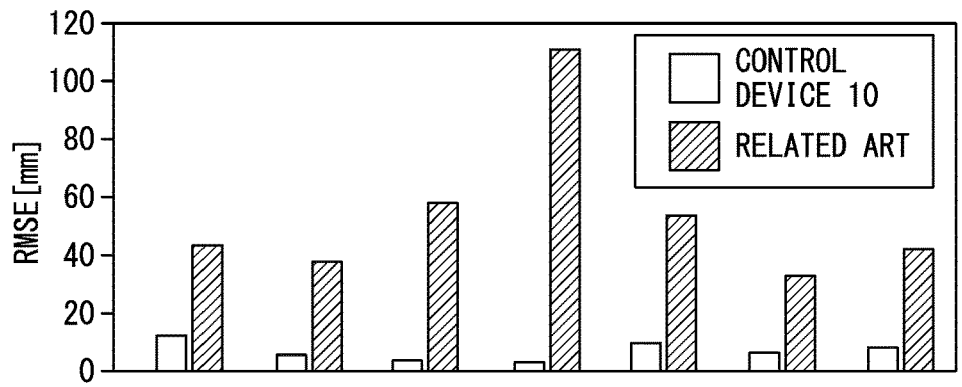
FIG. 13 is a first diagram illustrating effects of the control device according to the first embodiment.

Effects when control of the long flexible robot 6 is performed by using the learning model M1 will be described with reference to FIGS. 13 and 14.

Here, a plurality of target postures are given to each of the control device 10 according to the present embodiment and a control device of the related art (for example, the drive control device described in Patent Document 1), and the posture of the long flexible robot 6 is controlled. FIG. 13 illustrates an error of an actual posture of the long flexible robot 6 with respect to each target posture. The error of the actual posture (RMSE) with respect to the target posture is obtained by using Equation (1) below. In Equation (1), $\{x_j, y_j, z_j\}$ indicates the three-dimensional coordinates (actual posture) of the representative point of the long flexible robot 6 measured by the position measurement sensor 7, $\{x_{j,\,ref}, y_{j,\,ref}, z_{j,\,ref}\}$ indicates the target posture, and M indicates the number of representative points.

[Equation. 1]

$$RMSE = \sqrt{\frac{1}{M}\sum_{j=1}^{M}\left((x_j - x_{j,ref})^2 + (y_j - y_{j,ref})^2 + (z_j - z_{j,ref})^2\right)} \quad (1)$$

In a control device of the related art, disturbances such as weights of each unit U and the inspection cable 61, elongation and friction of the wires 651, and characteristics of the individual wires 651 were not considered. On the other hand, the control device 10 according to the present embodiment can construct the learning model M1 including these disturbances by learning a relationship between the actual posture of the long flexible robot 6 and the operation amount. As a result, the control device 10 according to the present embodiment can significantly reduce errors with respect to all target postures as compared with the control device of the related art, as illustrated in FIG. 13.

Figure 14:
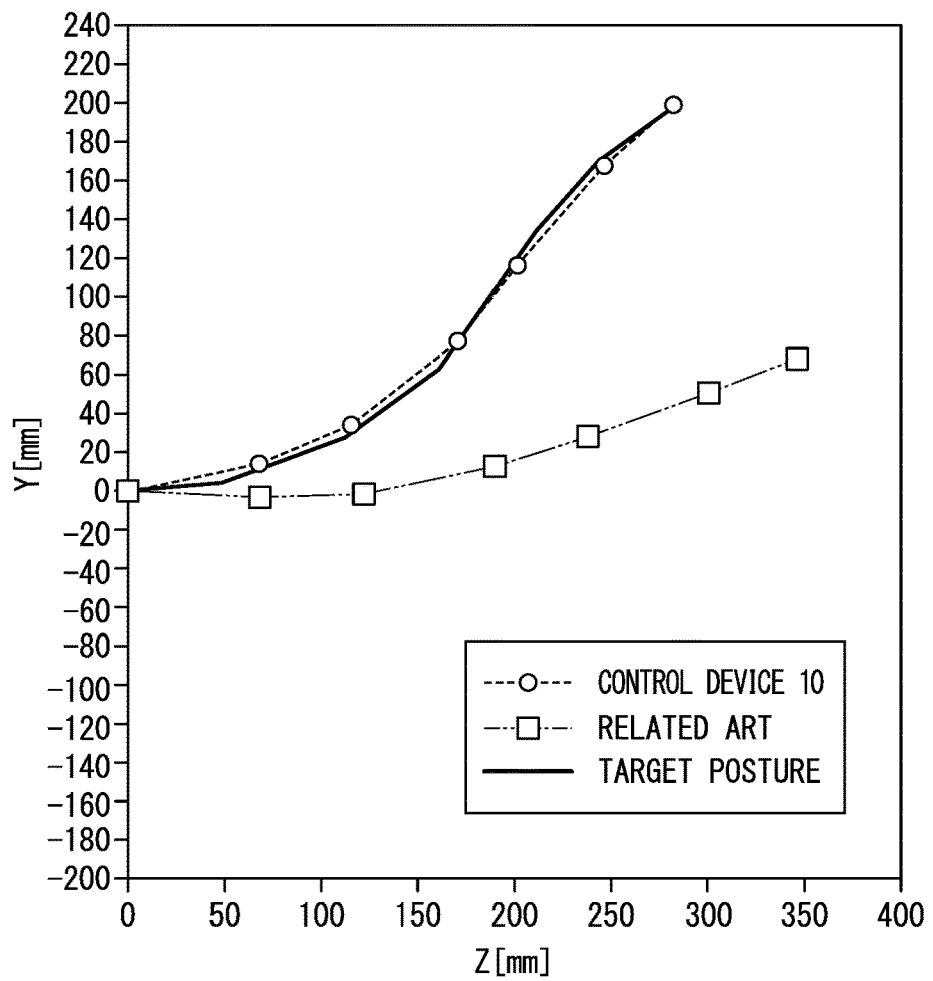
FIG. 14 is a second diagram illustrating the effects of the control device according to the first embodiment.

Further, FIG. 14 illustrates positional errors of respective representative points of the long flexible robot 6 with respect to a certain target posture. As illustrated in FIG. 14, since the control device of the related art does not consider the above-described disturbances, position of respective representative points greatly deviates from the target posture. On the other hand, the control device 10 according to the present embodiment can greatly reduce the error from the target posture for all the representative points.

As described above, with the control device 10 and the inspection system 1 including the same according to the first embodiment, it is possible to adjust the posture of the long flexible robot 6 more accurately.

Second Embodiment

Next, a control device and an inspection system including the same according to a second embodiment of the present disclosure will be described with reference to FIGS. 15 to 17.

Components common to the above-described embodiment are denoted by the same reference signs, and detailed descriptions thereof are omitted.

In the first embodiment, the operation amount determination unit 1002 randomly determines the value of the operation amount of the posture actuator 65 in the learning mode. That is, in the control device 10 according to the first embodiment, the posture of the long flexible robot 6 that is a learning target is not limited. However, since a route inside the inspection target is actually limited, it is considered that it is more efficient to perform learning focused on a posture that can be taken at the time of movement along the route. Therefore, in the learning mode, the control device 10 according to the present embodiment selects a posture that can be taken by the long flexible robot 6 in advance and performs learning focused on the selected posture, thereby efficiently constructing the learning model M1.

Figure 15:
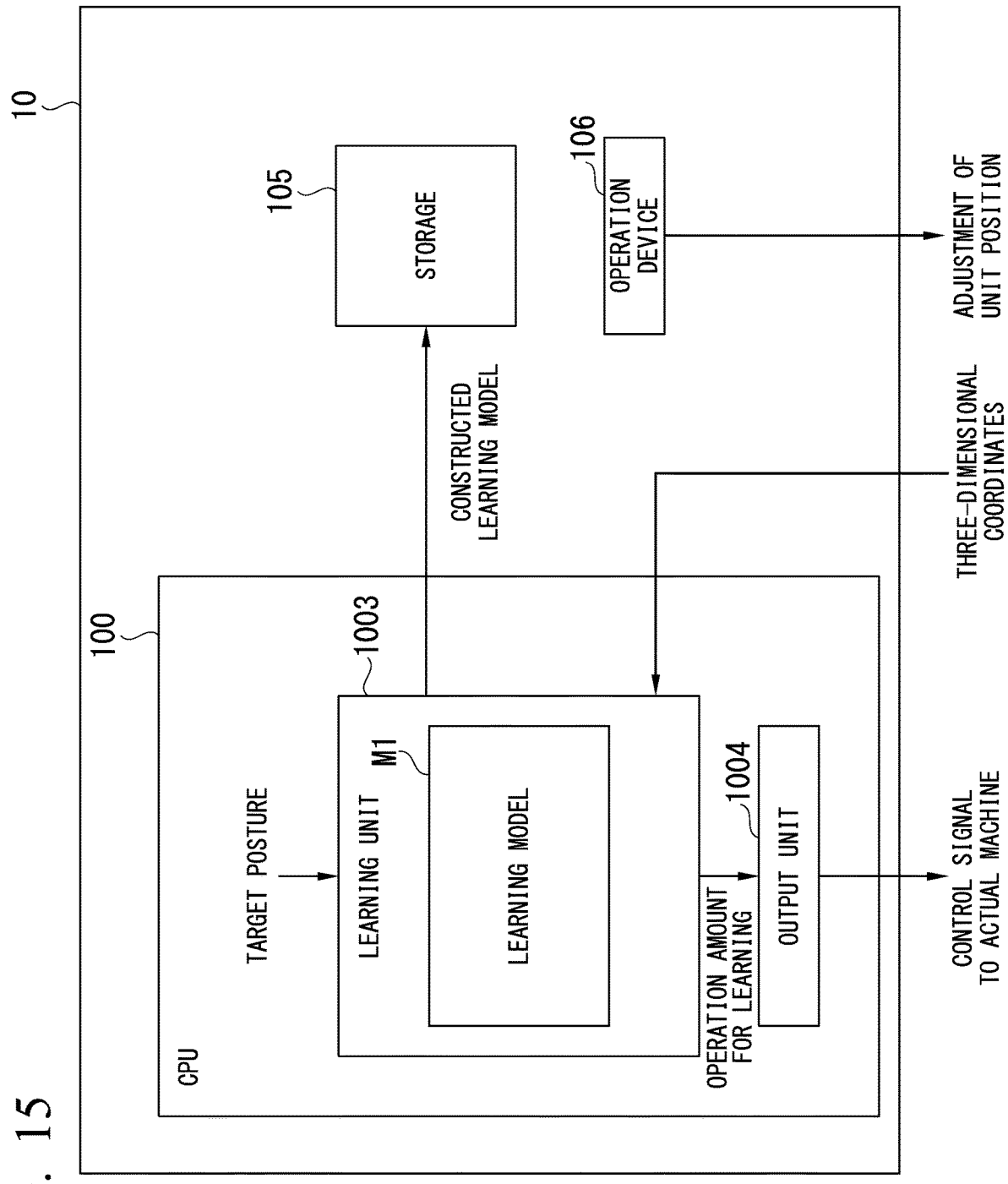
FIG. 15 is a diagram illustrating a functional configuration of a CPU according to a second embodiment.

FIG. 15 is a diagram illustrating a functional configuration of the control device according to the second embodiment.

As illustrated in FIG. 15, the control device 10 according to the present embodiment further includes an operation device 106 for enabling the operator to manually adjust the posture of each unit U of the long flexible robot 6. The operation device 106 is, for example, an input device such as a joystick or a touch panel.

Figure 16:
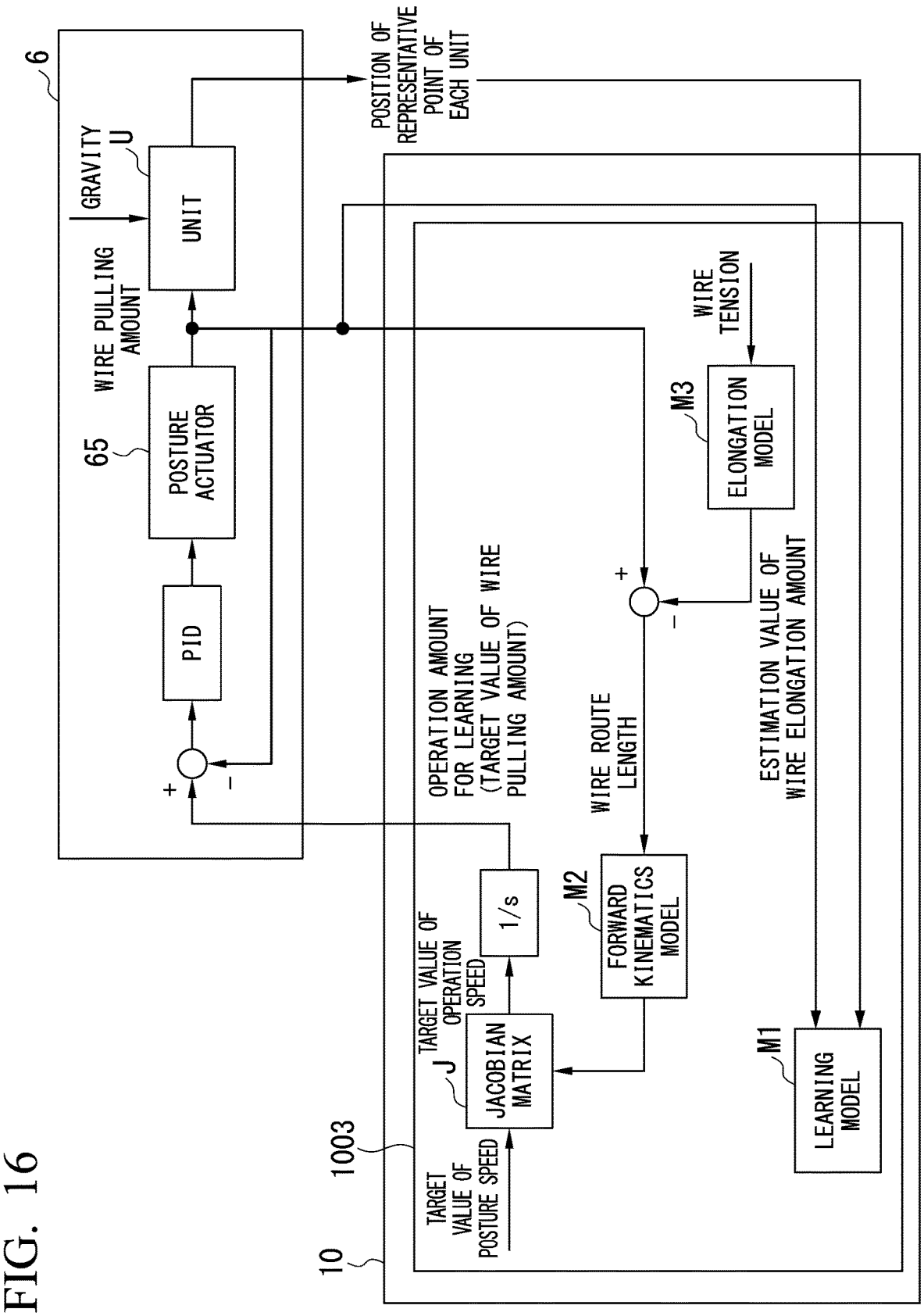
FIG. 16 is a first diagram illustrating functions of a control device according to the second embodiment.

FIG. 16 is a first diagram illustrating functions of the control device according to the second embodiment.

Figure 17:
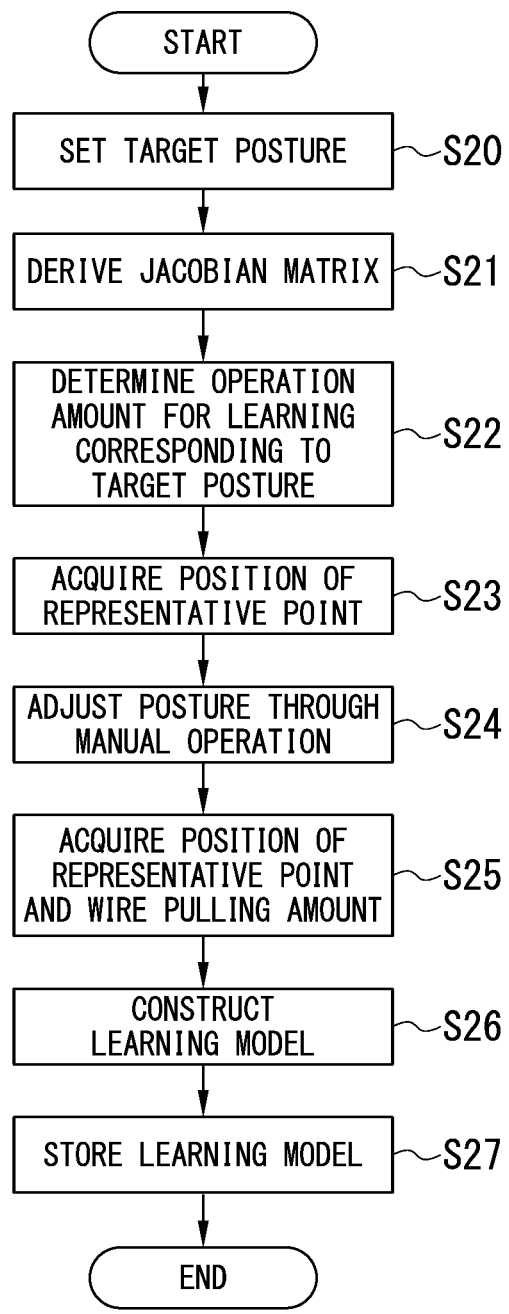

FIG. 17 is a diagram illustrating a processing flow of the learning mode of the CPU according to the second embodiment.

First, the learning unit 1003 of the control device 10 sets a target posture that is a learning target (step S20). In the present embodiment, the operator determines a plurality of target postures that can be taken by the long flexible robot 6 on the route of the inspection target, and instructs the learning unit 1003 via the input device 103.

Next, the learning unit 1003 obtains a wire route length on the basis of a current operation amount (a wire pulling amount) of the posture actuator 65 and a wire elongation amount estimation value obtained by inputting wire tension to an elongation model M3. Further, the learning unit 1003 estimates a current joint posture from the wire route length using forward kinematics, and derives a Jacobian matrix J (step S21).

Figure 18:
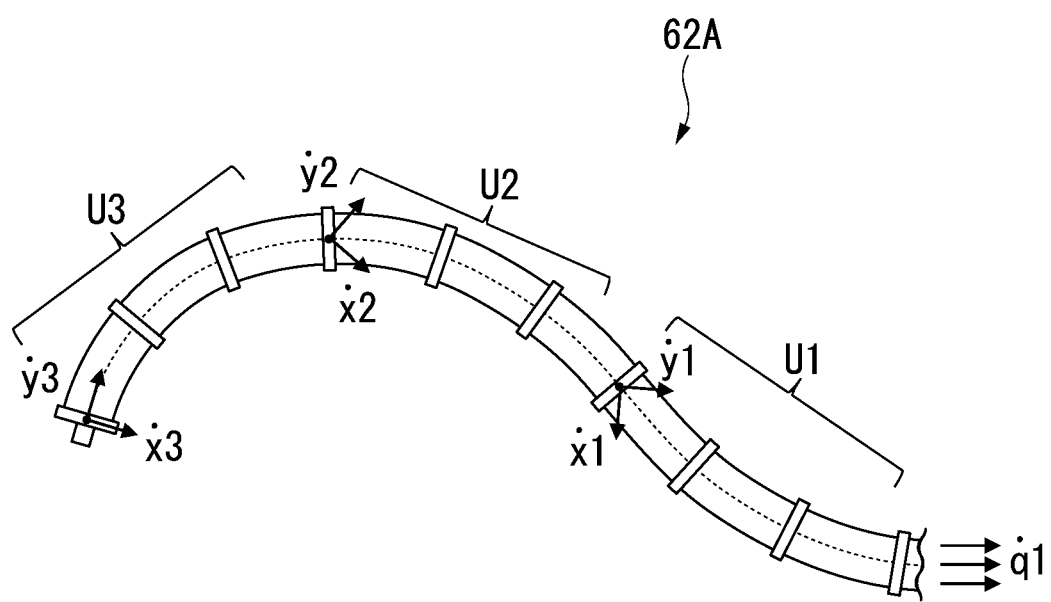
FIG. 18 is a second diagram illustrating functions of the control device according to the second embodiment.

As illustrated in FIG. 18, the active portion 62A of the long flexible robot 6 includes three units U1, U2, and U3, and three wires 651 are fixed to each unit. The Jacobian matrix J is a sensitivity matrix for converting a speed of a tip of each of the units U1, U2, and U3 into an operation speed of the posture actuator 65. A first term on the right side of Equation (2) below is the Jacobian matrix J, and elements of this matrix are basically determined by a posture angle of each unit U. q•i (i=1 to 9) on the left side of Equation (2) is a pulling amount speed of each wire 651. x•, y• of a second term on the right side of Equation (2) is a posture speed of the tip of each unit U, and q•m is an average value of the wire pulling amount of each unit U. "q•", "x•", and "y•" correspond to notations in which a dot symbol "•" is added above "q", "x", and "y".

[Equation. 2]

$$\begin{bmatrix} \dot{q}_1 \\ \dot{q}_2 \\ \dot{q}_3 \\ \dot{q}_4 \\ \dot{q}_5 \\ \dot{q}_6 \\ \dot{q}_7 \\ \dot{q}_8 \\ \dot{q}_9 \end{bmatrix} = \begin{bmatrix} & \cdots & \\ \vdots & \ddots & \vdots \\ & \cdots & \end{bmatrix} \begin{bmatrix} \dot{x}_1 \\ \dot{y}_1 \\ \dot{q}_{m1} \\ \dot{x}_2 \\ \dot{y}_2 \\ \dot{q}_{m2} \\ \dot{x}_3 \\ \dot{y}_3 \\ \dot{q}_{m3} \end{bmatrix} \quad (2)$$

Further, a forward kinematics model M2 is a model constructed on the basis of a geometrical specification (a segment length, a joint length, a wire pitch circle diameter, a wire phase, or the like) of each unit U or a wire route length obtained from the elongation model M3, and is a dynamic model for calculating a tip position of each unit U from a pulling amount of the wire 651. The elongation model M3 is a model for estimating a wire elongation amount from the wire tension on the basis of a tension-elongation characteristics (nonlinear) of the wire 651. When the wire elongation changes, the wire route length changes, which influences a bending angle of the unit U. In general, a wire with larger elongation tends to have a smaller bending angle than a wire with small elongation. In the present embodiment, an elongation amount estimation value of the wire 651 is calculated from a measurement result of the wire load detection unit 655 using the elongation model M3. For the forward kinematics model M2 and the elongation model M3, a forward kinematics model and an elongation model used in the control device of the related art may be used as they are.

Next, the learning unit 1003 uses the Jacobian matrix J to determine the set Wi of operation amounts for learning (i=1 to N; N=9 in the example of FIG. 16) for bringing each unit U of the long flexible robot 6 to the target posture (step S22). The operation amount for learning determined by the learning unit 1003 is output from the output unit 1004 as a control signal to the actual machine of the long flexible robot 6. Then, the long flexible robot 6 changes the posture of each unit U according to the control signal.

When the posture of each unit U of the long flexible robot 6 changes, the learning unit 1003 acquires the position of the representative point of each unit U of the long flexible robot 6 from the position measurement sensor 7 (step S23).

Next, a difference between the actual posture of each unit U and the target posture is obtained from the actual position of each unit U measured by the position measurement sensor 7. Further, a posture speed target value is calculated using the Jacobian matrix J so that an error between the actual posture and the target posture becomes small, and adjustment is performed so that the long flexible robot 6 takes a posture (shape) close to the target posture (step S24) by the operator performing manual inching via the operation device 106. The posture close to the target posture is, for example, a posture in which the position of the representative point of each unit U is positioned within a predetermined distance from the target position of each representative point in the target posture.

Next, the learning unit 1003 acquires learning data including the position of the representative point of each unit U after adjustment measured by the position measurement sensor 7, and an operation amount of the posture actuator 65 (a pulling amount of each wire 651) (step S25). The learning unit 1003 constructs the learning model M1 on the basis of the acquired learning data (step S26). The learning unit 1003 may sequentially collect learning data while the posture of the long flexible robot 6 is being manually adjusted.

Further, the learning unit 1003 stores the learned learning model M1 in the storage 105 (step S27).

As described above, the control device 10 according to the second embodiment manually adjusts the posture of the long flexible robot 6 so that the long flexible robot 6 approaches the target posture that can be taken by the long flexible robot 6, and acquires the posture of the long flexible robot 6 after adjustment and a corresponding operation amount as learning data. Thus, it is possible to efficiently perform learning of the learning model M1 with a small amount of learning data as compared with a random operation amount.

Further, the control device 10 according to the second embodiment uses the Jacobian matrix J derived from the forward kinematics model M2 and the elongation model M3 to determine the operation amount for learning for the target posture. Thus, the control device 10 can efficiently construct a learning model.

Third Embodiment

Next, a control device and an inspection system including the same according to a third embodiment of the present disclosure will be described with reference to FIG. 19.

Components common to the above-described embodiments are denoted by the same reference signs, and detailed descriptions thereof are omitted.

Figure 19:
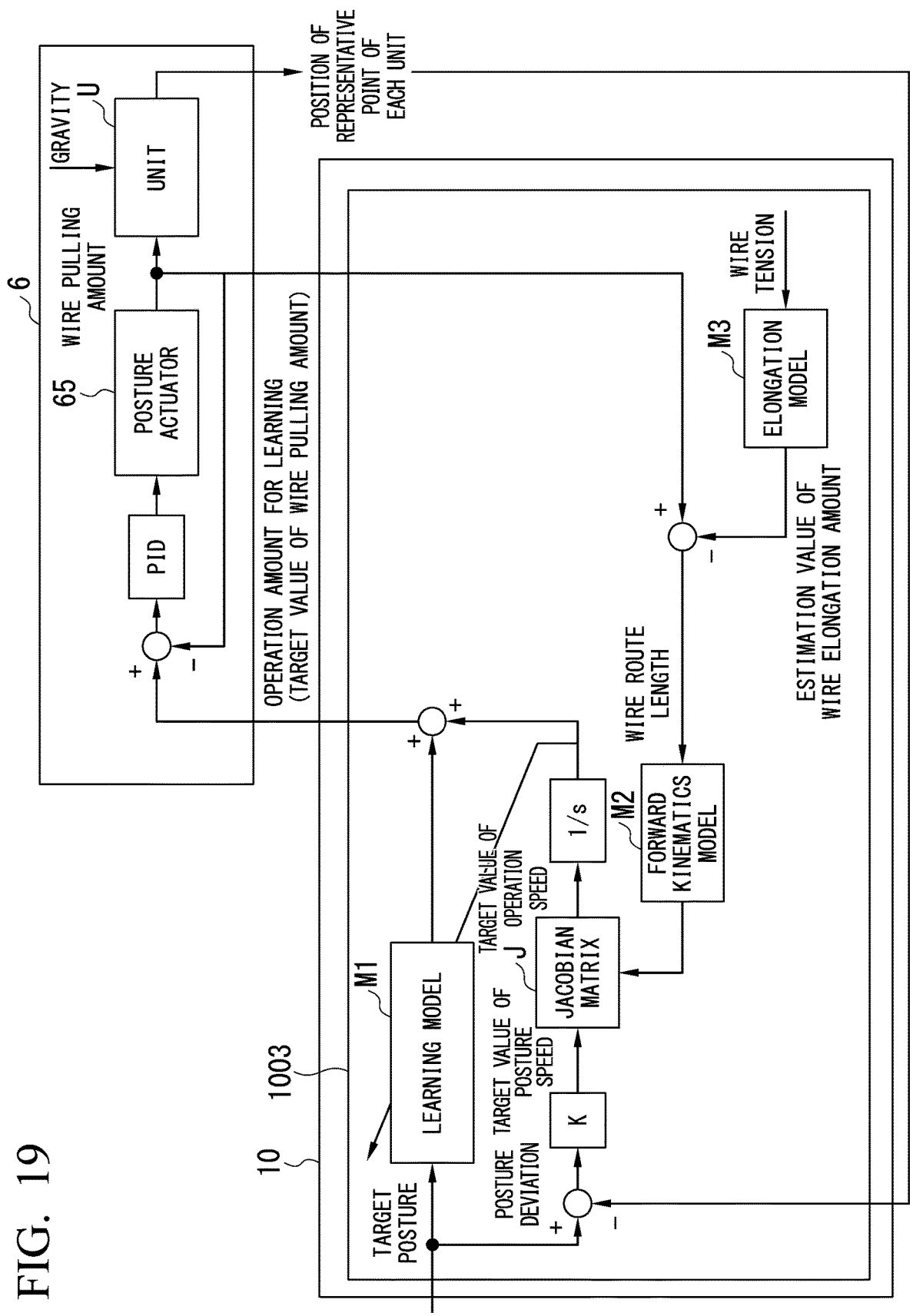
FIG. 19 is a diagram illustrating functions of a control device according to a third embodiment.

FIG. 19 is a diagram illustrating functions of the control device according to the third embodiment.

In the second embodiment, the learning unit 1003 uses the Jacobian matrix J to determine the operation amount for learning through a manual operation. On the other hand, the learning unit 1003 according to the present embodiment automatically determines the operation amount for learning as illustrated in FIG. 19.

Further, the learning unit 1003 determines the operation amount for learning using the learning model M1. The position measurement sensor 7 measures the actual posture of each unit U according to this operation amount for learning in real time. The learning unit 1003 sequentially corrects the operation amount for learning using the Jacobian matrix J from the error between the actual posture and the target posture of the unit U at each time. Further, the learning unit 1003 performs feedback control from the corrected operation amount for learning and the posture of the unit U to automatically update the learning model M1 in real time. Thus, it is possible to tune the learning model M1 more efficiently.

As described above, several embodiments according to the present invention have been described, but all these embodiments are presented as examples and are not intended to limit the scope of the invention. These embodiments can be implemented in various other forms, and various omissions, replacements, and changes can be made without departing from the gist of the invention. These embodiments and modifications thereof are included in the scope and spirit of the invention, as well as the scope of the invention described in the claims and equivalents thereof.

<Supplements>

The control device, inspection system, control method, and non-transitory computer-readable medium described in the above-described embodiments are ascertained as follows, for example.

(1) According to a first aspect of the present embodiment, a control device (10) for an inspection device (5) including a long flexible robot (6) that is formed by connecting a plurality of units and bendable at each unit with a desired curvature, and a posture actuator (65) configured to be able to adjust a posture of the unit, the control device including: a target posture specifying unit (1001) configured to specify a target posture including positions of representative points of the respective units traveling along the predetermined route; and an operation amount determination unit (1002) configured to determine an operation amount for bringing the unit to the target posture using a learning model with the target posture of the unit as an input and an operation amount of the posture actuator (65) with an output.

Thus, the control device can adjust a posture of a robot more accurately.

(2) According to a second aspect of the present embodiment, the control device (10) according to the first aspect further includes: a learning unit (1003) configured to construct the learning model on the basis of the position of the representative point acquired from a position measurement sensor configured to measure a three-dimensional position of the representative point and the operation amount of the posture actuator (65).

Thus, the control device can construct a relationship model (learning model) between the wire pulling amount and the joint posture.

(3) According to a third aspect of the present embodiment, in the control device (10) according to the second aspect, the learning unit (1003) obtains a Jacobian matrix representing a sensitivity matrix for converting a speed of a tip of each unit into an operation speed of the posture actuator (65) from a forward kinematics model with the operation amount of the posture actuator (65) as an input and the position of the representative point as an output, determines an operation amount for learning for bringing the unit closer to the target posture using the Jacobian matrix, and constructs the learning model on the basis of the target posture, the operation amount for learning, and the position of the representative point of the unit after an operation with the operation amount for learning.

Thus, the control device can efficiently construct the learning model with a small amount of learning data as compared with learning with a random operation amount for learning.

(4) According to a fourth aspect of the present embodiment, in the control device (10) according to the second aspect, the learning unit (1003) determines an operation amount for learning for bringing the unit closer to the target posture using the learning model, obtains a posture speed target value in real time from the target posture, the operation amount for learning, and a deviation between the actual posture of the long flexible robot (6) including positions of representative points of the unit after an operation with the operation amount for learning acquired from the position measurement sensor (7) that measures the positions of the representative points of the unit in real time, and the target posture, and updates the learning model.

The control device can determine the operation amount for learning using the learning model in this way, and automatically perform feedback control in real time from an error between the actual posture according to the operation amount for learning and the target posture to update the learning model in real time, thereby learning the learning model more efficiently.

(5) According to a fifth aspect of the present embodiment, an inspection system (1) includes the control device (10) according to any one of the first to fourth aspects and an inspection device (5).

(6) According to the sixth aspect of the present embodiment, a control method for an inspection device (5) including a long flexible robot (6) that is formed by connecting a plurality of units and bendable at each unit with a desired curvature, and a posture actuator (65) configured to be able to adjust a posture of the unit, the control method including: a step of specifying a target posture including positions of representative points of the respective units traveling along a predetermined route; and a step of determining an operation amount for bringing the unit to the target posture using a learning model with the target posture of the unit as an input and an operation amount of the posture actuator (65) with an output.

(7) According to a seventh aspect of the present embodiment, a non-transitory computer-readable medium having a program recorded thereon, the program causing an inspection device (5) including a long flexible robot (6) that is formed by connecting a plurality of units and bendable at each unit with a desired curvature, and a posture actuator (65) configured to be able to adjust a posture of the unit, to execute: a step of specifying a target posture including positions of representative points of the respective units traveling along a predetermined route; and a step of determining an operation amount for bringing the unit to the target posture using a learning model with the target posture of the unit as an input and an operation amount of the posture actuator (65) with an output.

With the control device, the inspection system, the control method, and the non-transitory computer-readable medium according to the present disclosure, it is possible to adjust the posture of the long flexible robot more accurately.

EXPLANATION OF REFERENCES

1 Inspection system
10 Control device
100 CPU
1001 Target posture specifying unit
1002 Operation amount determination unit
1003 Learning unit
1004 Output unit
101 Communication interface
102 Memory
103 Input device
104 Output device
105 Storage
106 Operation device
5 Inspection device
6 Long flexible robot
61 Inspection cable
611 Cable body
612 Sensor
62 Tube
62A Active portion
62B Driven portion
63, 63A, 63B Tube body
631 Cylindrical portion
632 Flange 633 Wire insertion hole
65 Posture actuator
651 Wire
652 Housing portion
652A Housing through hole
653 Pulley
654 Wire drive unit
655 Wire load detection unit
67 Advance and retreat actuator
671 Advance and retreat drive unit
672 Guide rail
7 Position measurement sensor
71 Marker
J Jacobian matrix
L Connection portion
M1 Learning model
M2 Forward kinematics model
M3 Elongation model

What is claimed is:

1. A control device for an inspection device comprising a long flexible robot that is formed by connecting a plurality of units and bendable at each unit with a desired curvature, and a posture actuator configured to be able to adjust a posture of the units, the control device comprising:
 a target posture specifying unit configured to specify a target posture including positions of representative points of the respective units traveling along a predetermined route;
 an operation amount determination unit configured to determine an operation amount for bringing the unit to the target posture using a learning model with the target posture of the unit as an input and an operation amount of the posture actuator as an output; and
 a learning unit configured to construct the learning model on the basis of the position of the representative point acquired from a position measurement sensor configured to measure a three-dimensional position of the representative point and the operation amount of the posture actuator,
 wherein the learning unit
 obtains a Jacobian matrix representing a sensitivity matrix for converting a speed of a tip of each unit into an operation speed of the posture actuator from a forward kinematics model with the operation amount of the posture actuator as an input and the position of the representative point as an output,
 determines an operation amount for learning for bringing the unit closer to the target posture using the Jacobian matrix, and
 calculates the speed of the tip of each unit from the Jacobian matrix so that an error between the posture of the unit after an operation with the operation amount for learning and the target posture becomes small, and learns the learning model on the basis of the position of the representative point of the unit after inching and the operation amount of the posture actuator when the inching is performed manually using an operation device.

2. An inspection system comprising:
 the control device according to claim 1; and
 the inspection device.

3. A control device for an inspection device comprising a long flexible robot that is formed by connecting a plurality of units and bendable at each unit with a desired curvature, and a posture actuator configured to be able to adjust a posture of the units, the control device comprising:
 a target posture specifying unit configured to specify a target posture including positions of representative points of the respective units traveling along a predetermined route;
 an operation amount determination unit configured to determine an operation amount for bringing the unit to the target posture using a learning model with the target posture of the unit as an input and an operation amount of the posture actuator as an output; and
 a learning unit configured to construct the learning model on the basis of the position of the representative point acquired from a position measurement sensor configured to measure a three-dimensional position of the representative point and the operation amount of the posture actuator,
 wherein the learning unit
 obtains a Jacobian matrix representing a sensitivity matrix for converting a speed of a tip of each unit into an operation speed of the posture actuator from a forward kinematics model with the operation amount of the posture actuator as an input and the position of the representative point as an output,
 determines an operation amount for learning for bringing the unit closer to the target posture using the learning model, and
 sequentially corrects the operation amount for learning using the Jacobian matrix from a deviation between the position of the representative point of the unit acquired in real time from the position measurement sensor and the target posture, and
 automatically updates the learning model in real time on the basis of the operation amount for learning after correction and the position of the representative point of the unit.

4. A control method for an inspection device comprising a long flexible robot that is formed by connecting a plurality of units and bendable at each unit with a desired curvature, and a posture actuator configured to be able to adjust a posture of the units, the control method comprising:
 specifying a target posture including positions of representative points of the respective units traveling along a predetermined route;
 determining an operation amount for bringing the unit to the target posture using a learning model with the target posture of the unit as an input and an operation amount of the posture actuator as an output; and
 constructing the learning model on the basis of the position of the representative point acquired from a position measurement sensor configured to measure a three-dimensional position of the representative point and the operation amount of the posture actuator,
 wherein during constructing the learning model,
 obtains a Jacobian matrix representing a sensitivity matrix for converting a speed of a tip of each unit into an operation speed of the posture actuator from a forward kinematics model with the operation amount of the posture actuator as an input and the position of the representative point as an output,
 determines an operation amount for learning for bringing the unit closer to the target posture using the Jacobian matrix, and
 calculates the speed of the tip of each unit from the Jacobian matrix so that an error between the posture of the unit after an operation with the operation amount for learning and the target posture becomes small, and learns the learning model on the basis of the position of the representative point of the unit after inching and the operation amount of the posture actuator when the inching is performed manually using an operation device.

5. A non-transitory computer-readable medium having a program recorded thereon, the program causing an inspection device comprising a long flexible robot that is formed by connecting a plurality of units and bendable at each unit with a desired curvature, and a posture actuator configured to be able to adjust a posture of the unit, to execute:
  specifying a target posture including positions of representative points of the respective units traveling along a predetermined route;
  determining an operation amount for bringing the unit to the target posture using a learning model with the target posture of the unit as an input and an operation amount of the posture actuator as an output; and
  constructing the learning model on the basis of the position of the representative point acquired from a position measurement sensor configured to measure a three-dimensional position of the representative point and the operation amount of the posture actuator,
  wherein during constructing the learning model,
  obtains a Jacobian matrix representing a sensitivity matrix for converting a speed of a tip of each unit into an operation speed of the posture actuator from a forward kinematics model with the operation amount of the posture actuator as an input and the position of the representative point as an output,
  determines an operation amount for learning for bringing the unit closer to the target posture using the Jacobian matrix, and
  calculates the speed of the tip of each unit from the Jacobian matrix so that an error between the posture of the unit after an operation with the operation amount for learning and the target posture becomes small, and learns the learning model on the basis of the position of the representative point of the unit after inching and the operation amount of the posture actuator when the inching is performed manually using an operation device.

* * * * *